US006810456B2

(12) United States Patent
Kim

(10) Patent No.: US 6,810,456 B2
(45) Date of Patent: Oct. 26, 2004

(54) ARBITER AND BUS SYSTEM THEREFOR

(75) Inventor: Jin-soo Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 472 days.

(21) Appl. No.: 09/822,836

(22) Filed: Apr. 2, 2001

(65) Prior Publication Data

US 2003/0115393 A1 Jun. 19, 2003

(30) Foreign Application Priority Data

Jul. 27, 2000 (KR) ........................................ 2000-43333

(51) Int. Cl.[7] ............................................. G06F 12/00
(52) U.S. Cl. ..................................... 710/240; 710/244
(58) Field of Search ............................. 710/22, 28, 39, 710/40, 52, 57, 72, 240–244, 310; 709/223, 225, 229; 712/34

(56) References Cited

U.S. PATENT DOCUMENTS

| 5,487,168 | A | | 1/1996 | Geiner et al. | |
|---|---|---|---|---|---|
| 5,617,575 | A | * | 4/1997 | Sakakibara et al. | ........... 712/34 |
| 5,870,560 | A | * | 2/1999 | Zulian | ........................ 709/225 |
| 6,199,124 | B1 | * | 3/2001 | Ramakrishnan et al. | ...... 710/40 |
| 6,434,645 | B1 | * | 8/2002 | Parvin et al. | .................. 710/72 |

* cited by examiner

Primary Examiner—Khanh Dang
(74) Attorney, Agent, or Firm—Sughrue Mion, PLLC

(57) ABSTRACT

An arbiter and bus system adopting the arbiter are provided. The bus system includes a bus request receiver, connected to a plurality of master devices, for receiving bus request inputs from the master devices, a priority level extractor for outputting priority level signals indicating predesignated priority levels corresponding to the master devices if the bus requests are input through the bus request receiver, and generating a priority level summation signal indicating all priority levels of the bus requests based on the output priority level signals, a priority output unit for outputting priority levels in order of decreasing priority based on the priority level summation signal generated by the priority level extractor, a priority mapper comprising a master device identifier output unit for extracting identifiers of the master devices submitting bus requests in order to output the extracted master device identifiers corresponding to the priority levels output from the priority output unit, and an arbitration circuit for granting access to a bus, to the master device corresponding to the identifier output from the priority mapper. Accordingly, an arbiter of a priority designation scheme implemented as a simple circuit and a bus system adopting the same arbiter are allowed.

18 Claims, 3 Drawing Sheets

ARBITER AND BUS SYSTEM THEREFOR

BACKGROUND OF THE INVENTION

1. Field of the Invention

The present invention relates to an arbiter and a bus system adopting the arbiter, and more particularly, to an arbiter using a priority mapper for priority arbitration and a bus system adopting the arbiter. The present application is based on Korean Patent Application No. 2000-43333, which is incorporated herein by reference.

2. Description of the Related Art

In a bus system in which multiple master devices share a common data bus, an arbiter serves to appropriately arbitrate a plurality of requests for access to a bus submitted by the multiple devices at the same time. A representative arbitration approach therefor is priority arbitration. According to priority arbitration, each master device is assigned a priority level and bus access or control is granted to the master device based on a priority scheme. This priority arbitration is classified into two types: one is a fixed priority scheme in which each device is assigned a fixed priority, and the other is a priority designation scheme in which a priority level is modified when necessary. An arbiter adopting the fixed priority scheme is simple to design, but the arbiter cannot be employed if the priority level assigned needs to be modified during operation of a bus system. The priority designation scheme is advantageous in supporting a master device which frequently transmits and receives data across a bus, if necessary. To this end, a priority level is dynamically assigned to each master device, and access to a bus is initially granted to the master device having the highest priority.

However, the priority designation scheme has a problem in that hardware is large and complicated compared to the fixed priority scheme. More specifically, the priority designation is performed by comparing each input port, to which a bus request is input from each master device, to look for the input port having the highest priority. Thus, for example, if the number of input ports is 3 or 4, three or six comparators are needed. That is, a number nC2 of comparators are needed for a number N of input ports, where "nC2" represents "n(n−1)/n!". An increase in the number of master devices increases the number of comparators exponentially, which may result in an extremely large arbiter circuit and slow arbitration speed. As a consequence, to achieve an arbiter circuit of an appropriate size and high arbitration speed, the number of master devices may be restricted.

SUMMARY OF THE INVENTION

To solve the above problems, it is an objective of the present invention to provide an arbiter of a priority designation scheme which can be implemented as a simple circuit, and a bus system adopting the arbiter.

It is another objective of the present invention to provide an arbiter providing a priority designation scheme without restriction on the number of master devices, and a bus system using the arbiter.

Accordingly, to achieve the above objectives, the present invention provides an arbiter including a bus request receiver, connected to a plurality of master devices, for receiving bus request inputs from the master devices, a priority level extractor for outputting priority level signals indicating predesignated priority levels corresponding to the master devices if the bus requests are input through the bus request receiver, and generating a priority level summation signal indicating all priority levels of the bus requests based on the output priority level signals, a priority output unit for outputting priority levels in order of decreasing priority based on the priority level summation signal generated by the priority level extractor, a priority mapper comprising a master device identifier output unit for extracting identifiers of the master devices submitting bus requests based on the priority level signals and outputting the extracted master device identifiers based on the order of the priority levels output from the priority output unit, and an arbitration circuit for granting access to the bus, to the master device having the identifier output from the priority mapper.

Preferably, the bus request receiver comprises a plurality of input ports connected to the plurality of master devices for receiving bus request inputs from the master devices, and a plurality of registers provided in the input ports for storing priority levels designated for the input ports. The priority level signal is represented using the same number of bits as the priority level.

Preferably, the priority level extractor performs an OR operation on one or more priority level signals on a bit-by-bit basis to generate the priority level summation signal represented in the same number of bits as the priority level signal. The OR operation is based on negative logic.

Preferably, the master device identifier output unit includes an identifier extractor and an identifier output unit. The identifier extractor extracts a bit column, including a bit indicating a priority level, requested from a matrix constructed of the priority level signals in order to generate an identifier signal, extracts a corresponding master device identifier based on the generated identifier signal and includes decoders for receiving input identifier signals to extract corresponding master device identifiers.

Preferably, the identifier output unit outputs an identifier of the master device having the priority level output from the priority output unit, wherein the output identifier is one of the identifiers extracted by the identifier extractor.

The bus system also provides a bus request receiver, connected to a plurality of master devices, for receiving bus request inputs from the master devices, a priority level extractor for outputting priority level signals indicating predesignated priority levels corresponding to the master devices if the bus requests are input through the bus request receiver, and generating a priority level summation signal indicating all priority levels of the bus requests based on the output priority level signals, a priority output unit for outputting priority levels in order of decreasing priority based on the priority level summation signal generated by the priority level extractor, a priority mapper comprising a master device identifier output unit for extracting identifiers of the master devices submitting bus requests in order to output the extracted master device identifiers corresponding to the priority levels output from the priority output unit, and an arbitration circuit for granting an access to bus to the master device having the identifier output from the priority mapper.

The bus request receiver includes a plurality of input ports connected to the plurality of master devices for receiving bus request inputs from the master devices, and a plurality of registers provided in the input ports for storing priority levels designated for the input ports. The priority level signal is represented using the same number of bits as the priority level.

Preferably, the priority level extractor performs an OR operation on one or more priority level signals on a bit-bybit basis in order to generate the priority level summation signal represented in the same number of bits as the priority level signal.

Preferably, the master device identifier output unit includes an identifier extractor and an identifier output unit. The identifier extractor extracts a bit column, including a bit indicating a priority level, requested from a matrix constructed of the priority level signals to generate an identifier signal, extracts a corresponding master device identifier based on the generated identifier signal, and includes decoders for receiving inputs of the identifier signals in order to extract corresponding master device identifiers.

The identifier output unit outputs an identifier of the master device having the priority level input from the priority output unit, wherein the output identifier is one of the identifiers extracted by the identifier extractor.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
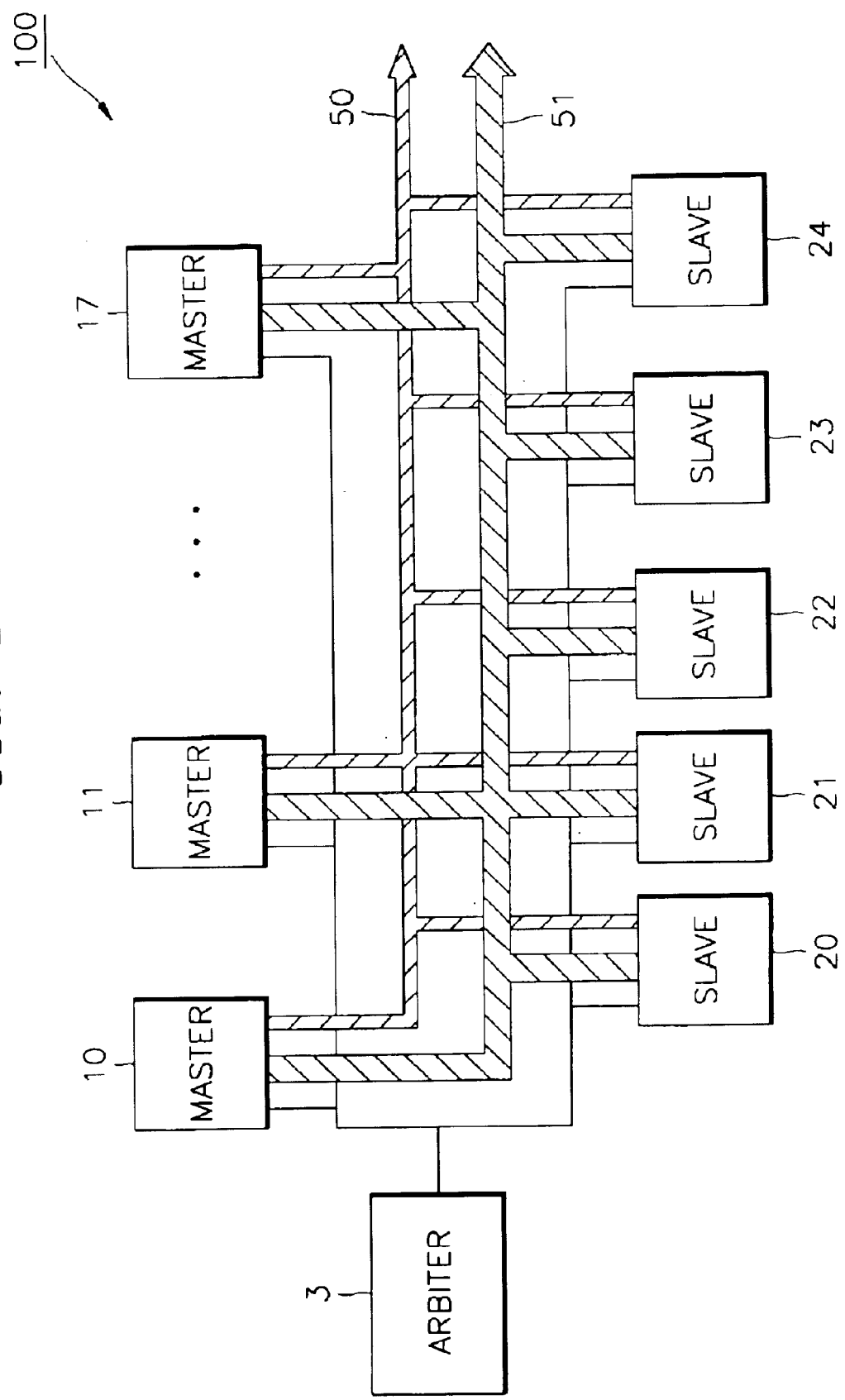
FIG. 1 is a schematic diagram showing a bus system according to a preferred embodiment of the present invention.

Referring to FIG. 1, a bus system 100 according to a preferred embodiment of the present invention includes a plurality of master devices 10–17, a plurality of slave devices 20–24, and an arbiter 3. The plurality of master devices 10–17 and the plurality of slave devices 20–24 are interconnected by an address/control bus 50 and a data bus 51. Here, the address/control bus 50 and the data bus 51 may be constructed as a single system bus. The data bus 51 may include a main data bus and a local data bus which function at different transfer speeds.

The master devices 10–17 generally refer to a processor or a direct memory access (DMA) device, and the slave devices 20–24 refer to memory such as RAM, ROM, or SDRAM, an I/O device, or other peripheral devices. The arbiter 3 grants access to the address/control bus 50 and the data bus 51, to the master device 10, 11, . . . or 17 having the highest priority among the mater devices 10–17 submitting a request for access to a bus, based on a priority designation scheme.

Figure 2:
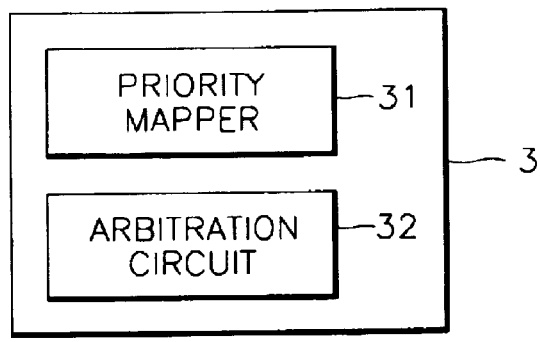
FIG. 2 is a block diagram showing the arbiter of FIG. 1.

Referring to FIG. 2, the arbiter 3 includes a priority mapper 31 and an arbitration circuit 32. If bus requests are input from one or more master devices 10–17, the priority mapper 31 outputs an identifier identifying the master device 10, 11, . . . , or 17 having the highest priority bus request of the input bus requests, according to a predesignated priority level. The arbitration circuit 32 grants the bus to the master device 10, 11, . . . , or 17 having the identifier output from the priority mapper 31.

Figure 3:
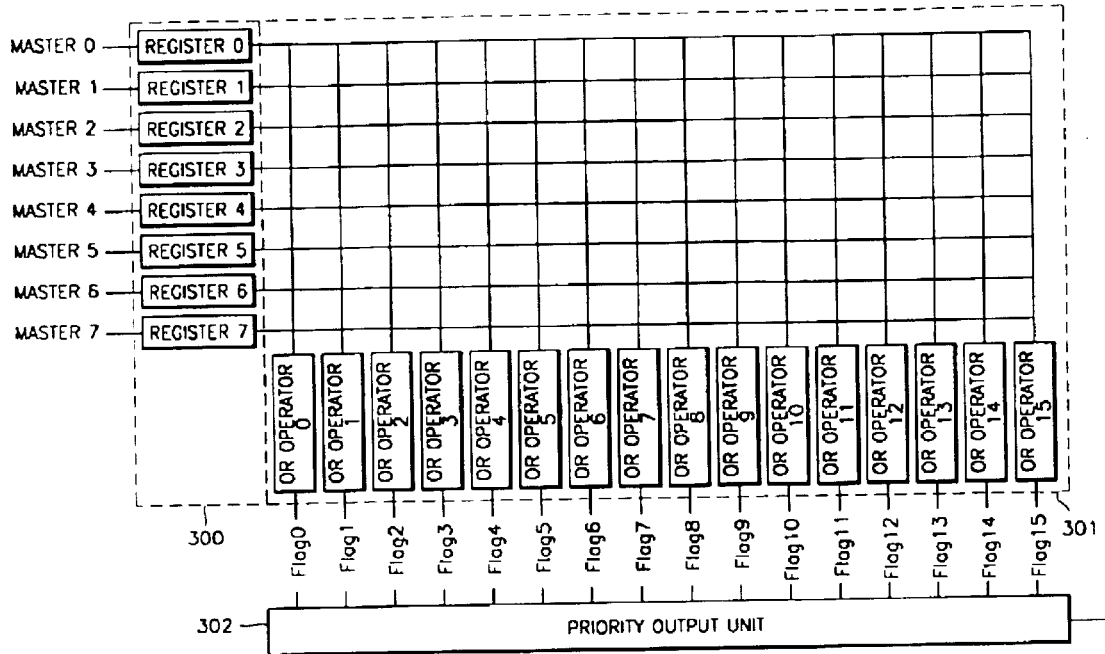
FIG. 3 is a detailed block diagram showing the priority mapper of FIG. 2.
Figure 3:
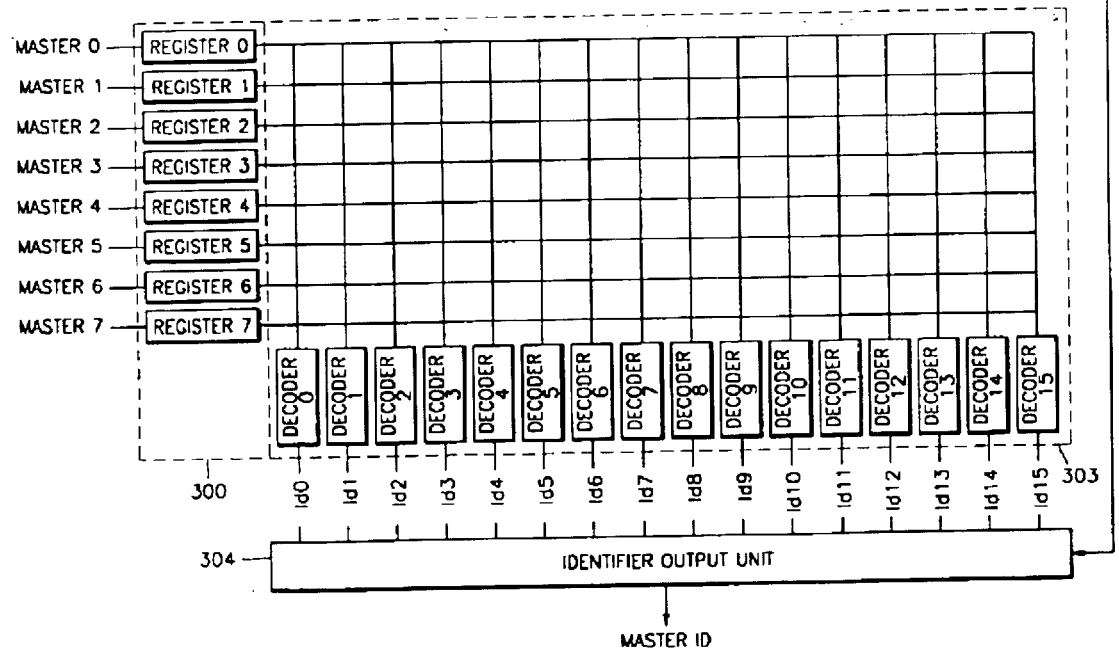

Referring to FIG. 3, the priority mapper 31 includes a bus request receiver 300, a priority level extractor 301, a priority output unit 302, an identifier extractor 303, and an identifier output unit 304. The bus request receiver 300 includes a plurality of input ports connected to the master devices 10–17, respectively, the input ports being capable of being designated priorities and receiving bus requests from the master devices 10–17. Furthermore, if bus requests are input through the input ports, the bus request receiver 300 outputs priority level signals indicating priority levels designated at the corresponding input ports to which the bus requests are input. The priority levels designated for the corresponding input ports are stored in corresponding registers. The priority level extractor 301 outputs a priority level summation signal indicating all priority levels of the input ports, to which the bus requests are input, based on the priority level signals output from the bus request receiver 300.

Since the bus system 100, according to this embodiment, includes eight master devices 10–17, eight input ports and eight registers 0–7 are provided in the bus request receiver 300. Furthermore, since priority according to this embodiment is classified into sixteen priority levels, one priority level signal is represented in 16 bits, and thus sixteen OR operators 0–15 are provided in the priority level extractor 301 in order to perform an OR operation for each bit of the priority level signal.

The priority output unit 302 outputs priority levels in order of decreasing priority based on the priority level summation signal output from the priority level extractor 301. Based on the priority level signals output from the bus request receiver 300, the identifier extractor 303 generates identifier signals indicating master device identifiers that correspond to the priority levels indicated in the priority level signal, and decodes the generated identifier signals to extract corresponding master device identifiers. Sixteen decoders 0–15, each corresponding to a priority level, are provided in the identifier extractor 303 in order to decode the identifier signals. The identifier output unit 304 outputs a master device identifier having the priority level output by the priority output unit 302, wherein the output identifier is one of the master device identifiers extracted by the identifier extractor 303.

For example, if the priority level of the master device 10 is 4 and that of the master device 11 is 6, priority level signals output from the bus request receiver 300 are 1110111111111111, and 1111101111111111, respectively. Thus, an OR operation is performed on the two priority level signals by the priority level extractor 301 on a bit-by-bit basis to output a priority level summation signal Flag0, . . . , Flag15 as 1110101111111111. When viewed from the most significant bit (MSB), the fourth and sixth bits are "0", which means that bus requests having priority levels 4 and 6 are made. If the bus requests have a higher priority, for example, when the priority level of the master device is a lower number, the priority output unit 302, to which the priority level summation signal is input, initially outputs 4 and then 6. An 8*16 matrix is formed in such a way that a row vector 1110111111111111, which is a priority level signal, corresponds to the master device 10, a row vector 1111101111111111, which is a priority level signal, corresponds to the master device 11, and a row vector 1111111111111111 corresponds to the remaining master devices 12–17 submitting no bus requests. The matrix is as follows:

111█1█1111111111

111█1█1111111111

111█1█1111111111

111█1█1111111111

-continued

111⬚1⬚1111111111

111⬚1⬚1111111111

111⬚1⬚1111111111

111⬚1⬚1111111111

The priority levels of bus requests in the matrix are 4 and 6, and thus the identifier extractor 303 generates identifier signals 01111111 and 10111111 composed of column bits arranged at the same positions as the corresponding priority levels, decodes the generated identifier signals by decoder 4 and decoder 6, respectively, and extracts corresponding master device identifiers. The identifier signals are represented in 8 bits, each bit corresponding to one of the master devices 10–17 in the order beginning with the MSB. Thus, it can be seen that bus requests having the priority levels 4 and 6 are submitted by the master device 10 and the master device 11, respectively. The identifier extractor 303 then extracts identifiers of the master device 10 and the master device 11 and outputs the extracted identifiers to the identifier output unit 304. Of the two identifiers of the master device 10 and the master device 11 input from the identifier extractor 303, the identifier output unit 304 initially outputs the identifier of the master device 10 and then the identifier of the master device 11 based on the order of priority levels output from the priority output unit 302.

More generally, this will be described using expressions written in the C-programming language. First, the master device 10 may have a priority level stored in the register 0 ranging from 0 to 15, and thus a priority level signal0 may be one of the following sixteen cases.

Case (priority0)
0: priority level signal0=0b1111111111111110;
1: priority level signal0=0b1111111111111101;
2: priority level signal0=0b1111111111111011;
3: priority level signal0=0b1111111111110111;
4: priority level signal0=0b1111111111101111;
5: priority level signal0=0b1111111111011111;
6: priority level signal0=0b1111111110111111;
7: priority level signal0=0b1111111101111111;
8: priority level signal0=0b1111111011111111;
9: priority level signal0=0b1111110111111111;
10: priority level signal0=0b1111101111111111;
11: priority level signal0=0b1111011111111111;
12: priority level signal0=0b1110111111111111;
13: priority level signal0=0b1101111111111111;
14: priority level signal0=0b1011111111111111;
15: priority level signal0=0b0111111111111111;
endcase
where 0b denotes a binary digit.

This is also expressed in the same manner in the master devices 11–17. A priority level summation signal indicates what priority levels bus requests have, and Flag0, . . . , Flag15 composing the priority level summation signal are constructed as follows:

Flag0=priority level signal0 [0] or priority level signal1 [0]
or priority level signal2 [0] or priority level signal3 [0]
or priority level signal4 [0] or priority level signal5 [0]
or priority level signal6 [0] or priority level signal7 [0]
or priority level signal8 [0] or priority level signal9 [0]
or priority level signal10 [0] or priority level signal11 [0]
or priority level signal12 [0] or priority level signal13 [0]
or priority level signal14 [0] or priority level signal15 [0]
. . .

The identifier signals 0–7 are generated by extracting each bit of a priority level signal and rearranging the extracted bits into a bit string.
Case (identifier signal0)
0bdddddddd0: Id0<=0;
0bddddddd01: Id0<=1;
0bdddddd011: Id0<=2;
0bddddd0111: Id0<=3;
0bdddd01111: Id0<=4;
0bddd011111: Id0<=5;
0bdd0111111: Id0<=6;
0b01111111: Id0<=7;
endcase
where d denotes "don't care". The remaining identifier signals 1–7 are constructed in the same manner.

Figure 4:
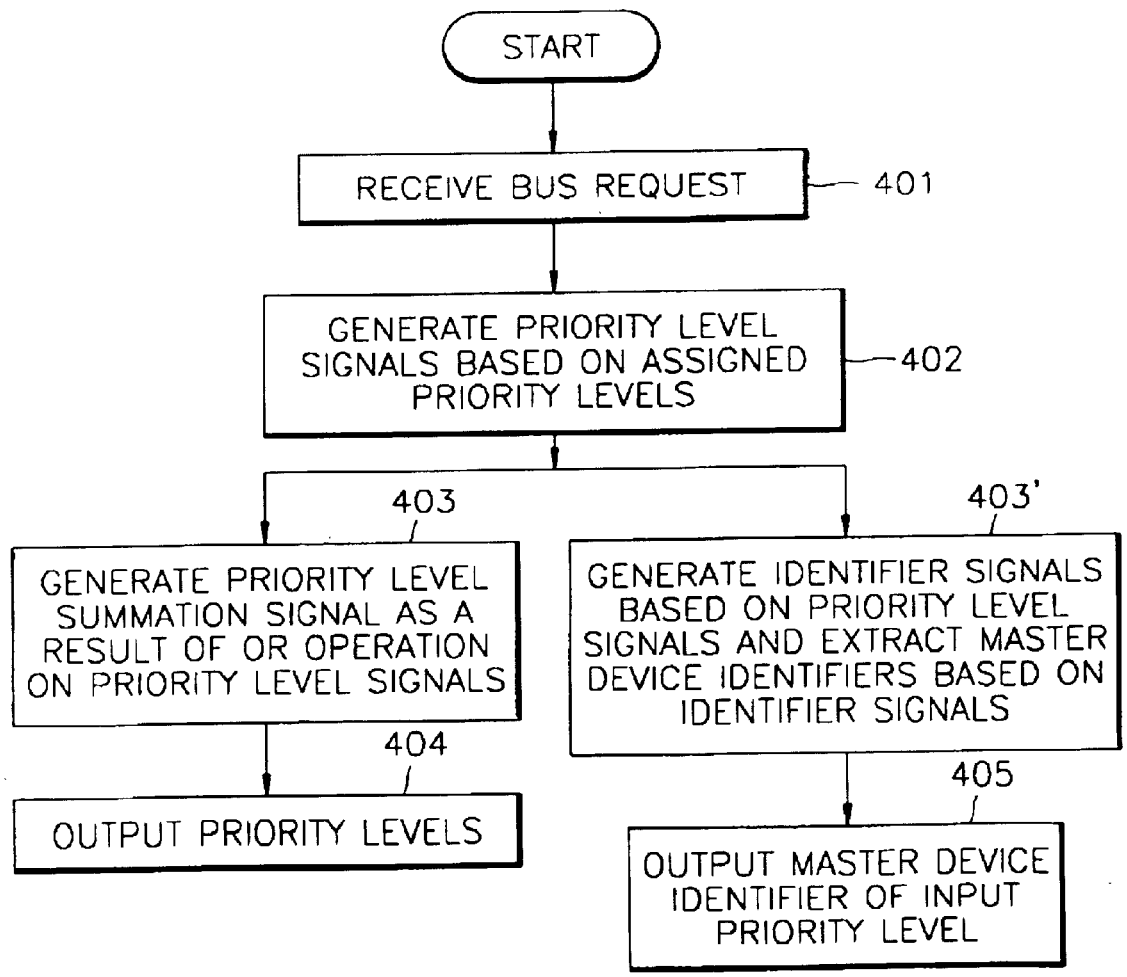
FIG. 4 is a flowchart showing a bus arbitration method.

Based on the above configurations, a bus arbitration method by the arbiter 3 according to a preferred embodiment of the present invention will now be described with reference to FIG. 4. Referring to FIG. 4, which is a flowchart showing a bus arbitration method, the arbiter 3 receives a bus request by the bus request receiver 300 (step 401). Next, priority level signals are generated based on priority levels assigned to the corresponding input ports provided in the bus request receiver 300 (step 402). Then, the priority level extractor 301 performs an OR operation on the generated priority level signals on a bit-by-bit basis in order to generate a priority level summation signal (step 403). The priority output unit 302 outputs priority levels in order of decreasing priority based on the priority level summation signal input from the priority extractor 301 (step 404).

Meanwhile, the identifier extractor 303 produces identifier signals from the priority level signals generated in the step 402 and decodes the produced identifier signals to extract identifiers of the master devices submitting bus requests (step 403'). Then, the identifier output unit 304 outputs the identifier of the master device having the priority level provided from the priority output unit 302 (step 405).

The arbitration circuit 32 grants the bus to the output master device identifier. The arbitration circuit 32 grants the bus to the master device corresponding to the identifier output from the priority mapper 31, and may have a circuit configuration widely adopted in a conventional arbiter.

Since the arbiter 3 according to this invention stores priority levels designated at the input ports in corresponding registers, the priority levels can be dynamically designated by changing values stored in the registers.

Furthermore, although this embodiment of the invention has been described with reference to the case in which there are eight master devices 10–17 and sixteen priority levels, various changes in the number of master devices or priority levels can be made.

As described above, the present invention provides an arbiter of a priority designation scheme implemented with a circuit having a simple configuration without using comparators, and a bus system adopting the arbiter. Accordingly, the present invention allows for a system which can be designed without a restriction on the number of master devices, a high speed arbitration with a simple circuit configuration, and changeable priority designation.

What is claimed is:
1. An arbiter comprising:
a priority mapper, wherein said priority mapper comprises:

a bus request receiver for receiving bus request inputs from a plurality of master devices;

a priority level extractor connected to said bus request receiver, for outputting priority level signals indicating predesignated priority levels corresponding to the plurality of master devices, if the bus requests are input through the bus request receiver, and generating a priority level summation signal indicating all priority levels of the bus requests based on the output priority level signals;

a priority output unit connected to said priority level extractor, for outputting priority levels in order of decreasing priority based on the priority level summation signal generated by the priority level extractor; and a master device identifier output unit connected to said priority output unit, for extracting identifiers of the plurality of master devices submitting bus requests based on the priority level signals output by the priority output unit and outputting the extracted master device identifiers based on the order of the priority levels output from the priority output unit; and said arbiter further comprising an arbitration circuit for granting access to a bus, to one of the plurality of master devices corresponding to the identifier output from the priority mapper.

2. The arbiter of claim 1, wherein the bus request receiver is connected to the plurality of master devices.

3. The arbiter of claim 2, wherein the bus request receiver comprises a plurality of input ports connected to the plurality of master devices for receiving bus request inputs from the plurality of master devices, and a plurality of registers provided in the plurality of input ports for storing priority levels designated for the plurality of input ports.

4. The arbiter of claim 3, wherein each of the output priority level signals is represented using the same number of bits as the priority level.

5. The arbiter of claim 4, wherein the priority level extractor performs an OR operation on one or more priority level signals on a bit-by-bit basis in order to generate the priority level summation signal, which is represented in the same number of bits as each of the one or more priority level signals.

6. The arbiter of claim 1, wherein the master device identifier output unit comprises an identifier extractor and an identifier output unit, wherein the identifier extractor extracts a bit column requested from a matrix constructed of the priority level signals in order to generate an identifier signal, and extracts a corresponding master device identifier based on the generated identifier signal; and wherein the identifier output unit outputs an identifier of the master device corresponding to the priority level output from the priority output unit, wherein said identifier of the master device is one of the master device identifiers extracted by the identifier extractor.

7. The arbiter of claim 6, wherein the bit column extracted by the identifier extractor includes a bit indicating a priority level.

8. The arbiter of claim 6, wherein the identifier extractor comprises one of a plurality of decoders for receiving the identifier signal in order to extract the corresponding master device identifier.

9. The arbiter of claim 7, wherein the identifier extractor comprises one of a plurality of decoders for receiving the identifier signal in order to extract the corresponding master device identifier.

10. A bus system comprising:

a priority mapper, wherein said priority mapper comprises:

a bus request receiver for receiving bus request inputs from a plurality of master devices;

a priority level extractor connected to said bus request receiver, for outputting priority level signals indicating predesignated priority levels corresponding to the plurality of master devices, if the bus requests are input through the bus request receiver, and generating a priority level summation signal indicating all priority levels of the bus requests based on the output priority level signals;

a priority output unit connected to said priority level extractor, for outputting priority levels in order of decreasing priority based on the priority level summation signal generated by the priority level extractor; and a master device identifier output unit connected to said priority output unit, for extracting identifiers of the plurality of master devices submitting bus requests in order to output the extracted master device identifiers corresponding to the priority levels output from the priority output unit; and said bus system further comprising an arbitration circuit for granting access to a bus, to one of the plurality of master devices corresponding to the identifier output from the priority mapper.

11. The bus system of claim 10, wherein the bus request receiver is connected to the plurality of master devices.

12. The bus system of claim 11, wherein the bus request receiver comprises a plurality of input ports connected to the plurality of master devices for receiving bus request inputs from the plurality of master devices, and a plurality of registers provided in the input ports for storing priority levels designated for the input ports.

13. The bus system of claim 12, wherein each of the output priority level signals is represented using the same number of bits as the priority level.

14. The bus system of claim 13, wherein the priority level extractor performs an OR operation on one or more priority level signals on a bit-by-bit basis in order to generate the priority level summation signal, which is represented in the same number of bits as each of the one or more priority level signals.

15. The bus system of claim 10, wherein the master device identifier output unit comprises an identifier extractor and an identifier output unit, wherein the identifier extractor extracts a bit column requested from a matrix constructed of the priority level signals in order to generate an identifier signal, and extracts a corresponding master device identifier based on the generated identifier signal; and wherein the identifier output unit outputs an identifier of the master device corresponding to the priority level input from the priority output unit, wherein said master device identifier is one of the master device identifiers extracted by the identifier extractor.

16. The bus system of claim 15, wherein the bit column extracted by the identifier extractor includes a bit indicating a priority level.

17. The bus system of claim 15, wherein the identifier extractor comprises one of a plurality of decoders for receiving the identifier signal, in order to extract the corresponding master device identifier.

18. The bus system of claim 16, wherein the identifier extractor comprises one of a plurality of decoders for receiving the identifier signal, in order to extract the corresponding master device identifier.

* * * * *